(12) United States Patent
Yamazaki et al.

(10) Patent No.: US 8,370,627 B2
(45) Date of Patent: Feb. 5, 2013

(54) CONFIDENTIAL COMMUNICATION METHOD

(75) Inventors: Haruaki Yamazaki, Kofu (JP); Hidetoshi Mino, Kofu (JP); Yoshimichi Watanabe, Kofu (JP)

(73) Assignee: University of Yamanashi, Kofu-Shi (JP)

(*) Notice: Subject to any disclaimer, the term of this patent is extended or adjusted under 35 U.S.C. 154(b) by 427 days.

(21) Appl. No.: 12/733,556

(22) PCT Filed: Dec. 30, 2008

(86) PCT No.: PCT/JP2008/073878
§ 371 (c)(1),
(2), (4) Date: Mar. 9, 2010

(87) PCT Pub. No.: WO2009/087939
PCT Pub. Date: Jul. 16, 2009

(65) Prior Publication Data
US 2010/0281257 A1  Nov. 4, 2010

(30) Foreign Application Priority Data
Jan. 4, 2008  (JP) .................................. 2008-000211

(51) Int. Cl.
*H04L 29/06*  (2006.01)
(52) U.S. Cl. ........................ 713/162; 713/160; 713/161
(58) Field of Classification Search ........... 713/160–163
See application file for complete search history.

(56) References Cited

U.S. PATENT DOCUMENTS 6,247,054 B1 * 6/2001 Malkin ........................ 709/225
(Continued)

FOREIGN PATENT DOCUMENTS

JP  2003-078518  3/2003
JP  2004-229071  8/2004
(Continued)

OTHER PUBLICATIONS

Hitoshi Kunimai, Tatsuya Kainuma, Susumu Sakamoto; Kazukuni Furuhara, Shinji Yamanaka, "Kojin Joho O Hogo Suru Tokumei P2P Network Kiban", The FY2002 Projects Report Rev. 2, [retrieval date Mar. 23 2009] Internet www.ipa.go.jp/spc/report/2fy-pro/index.htm.

(Continued)

*Primary Examiner* — Benjamin Lanier
(74) *Attorney, Agent, or Firm* — Manabu Kaneseake

(57) ABSTRACT

It is an object of the present invention to solve a problem included in the onion routing which is used as a confidential communication method, that if a system down occurs in a computer within a communication route, connection is not made to further components at all, or a problem that the system and the traffic become slow by using multiplexed encryption. It is a communication method in which a client of an information providing source encrypts random numbers and calculates its hash value using respective public keys of an information server to which it connects, a function server of a destination to be sent, and an information server to which the function server connects, respective servers decrypt the encrypted random number using their own secret keys to compare the random number with the hash value, and thus, the client determines whether or not the route is related to the client. In such a way, information can be provided as an information providing source and an information provided destination are hidden, and as a response to provided contents from the function server which is the information provided source can also be kept anonymous.

11 Claims, 8 Drawing Sheets

U.S. PATENT DOCUMENTS 6,438,595 B1 * 8/2002 Blumenau et al. ............ 709/226
7,957,374 B2 * 6/2011 Tanaka et al. ................ 370/389

FOREIGN PATENT DOCUMENTS

| JP | 2005-159912 | 6/2005 |
| JP | 2005-167968 | 6/2005 |

OTHER PUBLICATIONS

Hitoshi Tamura, Kazukuni Furuhara, Hideki Imai, "doteki network ni okeru sohoko tokumei tsushinro kochiku shuho no teian", Transactions of Information processing Society of Japan, Feb. 15, 2007, vol. 48, No. 2, pp. 494 to 504.

* cited by examiner

CONFIDENTIAL COMMUNICATION METHOD

RELATED APPLICATIONS

The present application is National Phase of International Application No. PCT/JP2008/073878 filed Dec. 30, 2008, and claims priority from, Japanese Application No. 2008-000211 filed Jan. 4, 2008, the disclosure of which is hereby incorporated by reference herein in its entirety.

TECHNICAL FIELD

The present invention relates to a technology of transmitting contents of information to a provided destination in secrecy while a providing source that provides the information is hidden, and further relates to a confidential communication method that makes it possible for the provided destination that has received the contents to return a response to the providing source, while the provided destination does not know the providing source.

BACKGROUND ART

As an anonymous information providing method (communication method in which an information providing source is hidden) in which an information provider provides information to, for example, a research company which is an information provided destination by utilizing a computer system, while anonymity is maintained, there has conventionally been used a method in general in which a reliability confirming person is set as a third party that verifies an information provider's identification and BBS (stored public information service) for offering public services of stored information is also set, and after the information provider requests the information provider's identification to the reliability confirming person to verify the identification, the information provider transmits the information to the research company via an anonymous communication channel, while in the research company, if it is necessary to specify the information provider after receiving the information from the information provider, inquiry for verifying the identification of the information provider is made to the reliability confirming person, and thus, the information provider can be specified.

In this method, however, difficulty to build a reliable third party causes serious problems on actual operation.

Various proposals and product developments for preserving communication contents from tapping, alteration, or the like of malicious users have been made with the spread of the Internet.

Meanwhile, necessity for hiding not only the communication contents but also the destination or the source is often pointed out. Addresses of the destination and the source can be traced by tapping header information or tracing information on a router through which the information has routed.

Hence, necessity of hiding the header information, such as an IP address or the like, arises, but when a hiding technique, such as encryption or the like, is directly applied to the header, it will become impossible for the information to pass through telecommunication equipment, such as a router and the like. In order to solve such problems, various techniques have been increasingly proposed in these days.

Accordingly, an anonymity communication method using onion routing has been proposed as a devised representative method (Patent Document 1). Hereinafter, this method will be described briefly.

FIG. 1 is a flow chart for explaining the anonymity communication method in which the onion routing is used. Adr1 to AdrN−1 used at each step from S0 to S5 are addresses (destinations) of communication apparatuses (they are hereinafter referred to as servers) in a route for connecting an information provider and an information provided destination. The information providing source is represented as Adr0, while the information provided destination is represented as AdrN.

In this Figure, contents enclosed with parentheses ( ) are encrypted, and each server has a key that can decrypt the encryption within the parentheses ( ). This key is represented as KyJ. It is to be noted that symbols I and J are counters for explaining this flow chart, and are not required for actual communication.

At Step S0, the address (destination) of Adr0 is an address of the information providing source. The information providing source transmits (Adr2 (Adr3 . . . (AdrN) . . . )) which is onion routing information to the server of address Adr1 to be first sent, together with providing information which is desired to be provided to the information provided destination.

In a state of I=N−1 and J=1 which is a first step of Step S1, the destination is the server of the address Adr1, and the Adr1 server has a decryption key Ky1 and decrypts the encryption within the parentheses ( ) using this Ky1 to thereby acquire information indicating that Adr2 is the next destination.

Subsequently, at Step S2, (Adr3 (Adr4 . . . (AdrN) . . . )) which is the next onion routing information is sent to the next Adr2 server, together with the received providing information. Step S3 and Step S4 are a counter addition/subtraction, which is set for explanation of this flow chart, and its determination, respectively.

As described above, the providing information is hereinafter sent to Adr3 and Adr4 sequentially, and is finally transmitted to the apparatus of the address AdrN.

At this time, Adr1 to AdrN are encrypted so as for the decryption keys Ky1 to KyN to decrypt them, respectively. As a result of performing such information transmission, the intermediate server knows only the addresses of its previous and following servers. In order to specify Adr0 of the information providing source, the information must be acquired from all the servers, and as the result, the information providing source is hidden.

Patent Document 1: Japanese Unexamined Patent Publication (Kokai) No. 2004-229071

DISCLOSURE OF INVENTION

Problem to be Solved by the Invention

In this method, the destinations are sequentially specified by decryption, and the destinations are multiplexedly encrypted so as to reach a target destination at certain times, so that if any one of the computers through which the information passes during repetition is shut down, the information will not be transmitted therefrom. Moreover, pieces of information which are frequently transmitted and received require a workload for processing at each node to thereby make transmission speed of the network slow, so that there is a fear that communication traffic interference may be caused. Further, since it is necessary to know secret codes corresponding to the keys of all the servers, such as an apparatus used at the information providing source, a server connected thereto, and the like in preparation for interference, a problem also arises in information leakage.

A method according to the present invention solves such problems, and it is an object thereof to make it possible to hide the address of the source also to the receiver. Further, it is an object thereof to make it possible to receive the response from the receiver while the source is hidden.

Means for Solving Problem

In order to achieve the above-described object, the invention according to claim 1 is characterized in that in a confidential communication method of messages transmitted and received between a transmission source client that is a subordinate of one communication server of a plurality of communication servers, and a transmission destination client that is a subordinate of other communication server, wherein the transmission source client and the transmission destination client connect to a loop network which forwards the message on the basis of a predetermined rule, the transmission source client creates first confidential address information including a hash value of a generated random bit string, and a code string obtained by encrypting the random bit string using a public key of the transmission destination client, and second confidential address information including a code string obtained by encrypting the random bit string using a public key of a communication server to which the transmission destination client connects, and a hash value, and forwards a message including at least the first confidential address information, the second confidential address information, and a message body, to the loop network via the one communication server. As a result, it is possible to provide the information while hiding that who the information provider is and where the information receiver is.

The invention according to claim 2 is the confidential communication method of the message according to claim 1, and is characterized in that the transmission source client further creates third confidential address information including a code string obtained by encrypting the random bit string using a public key of the transmission source client, and the hash value, and fourth confidential address information including a code string obtained by encrypting the random bit string using the public key of a communication server to which the transmission destination client connects, and the hash value, and transmits the third confidential address information and the fourth confidential address information while including them in the message addressed to the transmission destination client. As a result, it is possible to return the response while the information provider is hidden.

The invention according to claim 3 is characterized in that the communication server to which the transmission destination client connects decodes the second confidential address information in the message forwarded via the loop network using a secret key corresponding to its own public key, and transmits it to one or a plurality of clients which are its own subordinates if the hash values thereof are matched with each other, and the client that has received the message decodes the first confidential address information in the message using its own secret key, and receives the message as the message is addressed to itself if the hash values thereof are matched with each other.

The invention according to claim 4 is characterized in that a message body of the message transmitted from the transmission source client is an encrypted transmission sentence including a password encrypted using the public key of the transmission destination client, and the transmission destination client decrypts the encrypted transmission sentence using its own secret key. As a result, it is possible to prevent, for example, contents of the message to consult about from leaking to a party other than the party concerned.

The invention according to claim 5 is characterized in that the transmission destination client that has received the message transmitted from the transmission source client, as a return message of the received message, forwards a return message including at least the third confidential address information, the fourth confidential address information, and a return message body, to the loop network via a communication server to which it connects. As a result, it is possible to prevent, for example, a reply message to consultation contents from leaking to a party other than the party concerned.

The invention according to claim 6 is characterized in that the communication server to which the transmission source client connects decodes the fourth confidential address information in the return message forwarded via the loop network using a secret key corresponding to its own public key, and transfers the return message to one or a plurality of clients that are its own subordinates if the hash values thereof are matched with each other, and the client that has received the return message decodes the third confidential address information in the return message using its own secret key, and receives the return message as the return message is addressed to itself if the hash values thereof are matched with each other. As a result, it is possible to prevent the contents of the return message from leaking to a party other than the party concerned.

Effect of the Invention

According to the present invention, the messages can be transmitted and received while the client that is the information provider is not specified, and while hiding that to which function server that provides functions such as a consultation service, a bulletin board, and the like, the information is provided. Furthermore, it is also possible to respond to the provided information while not knowing that from whom the information is provided, thus allowing transmission and reception of all pieces of information to be hidden.

EXPLANATIONS OF LETTERS OR NUMERALS

Figure 1:
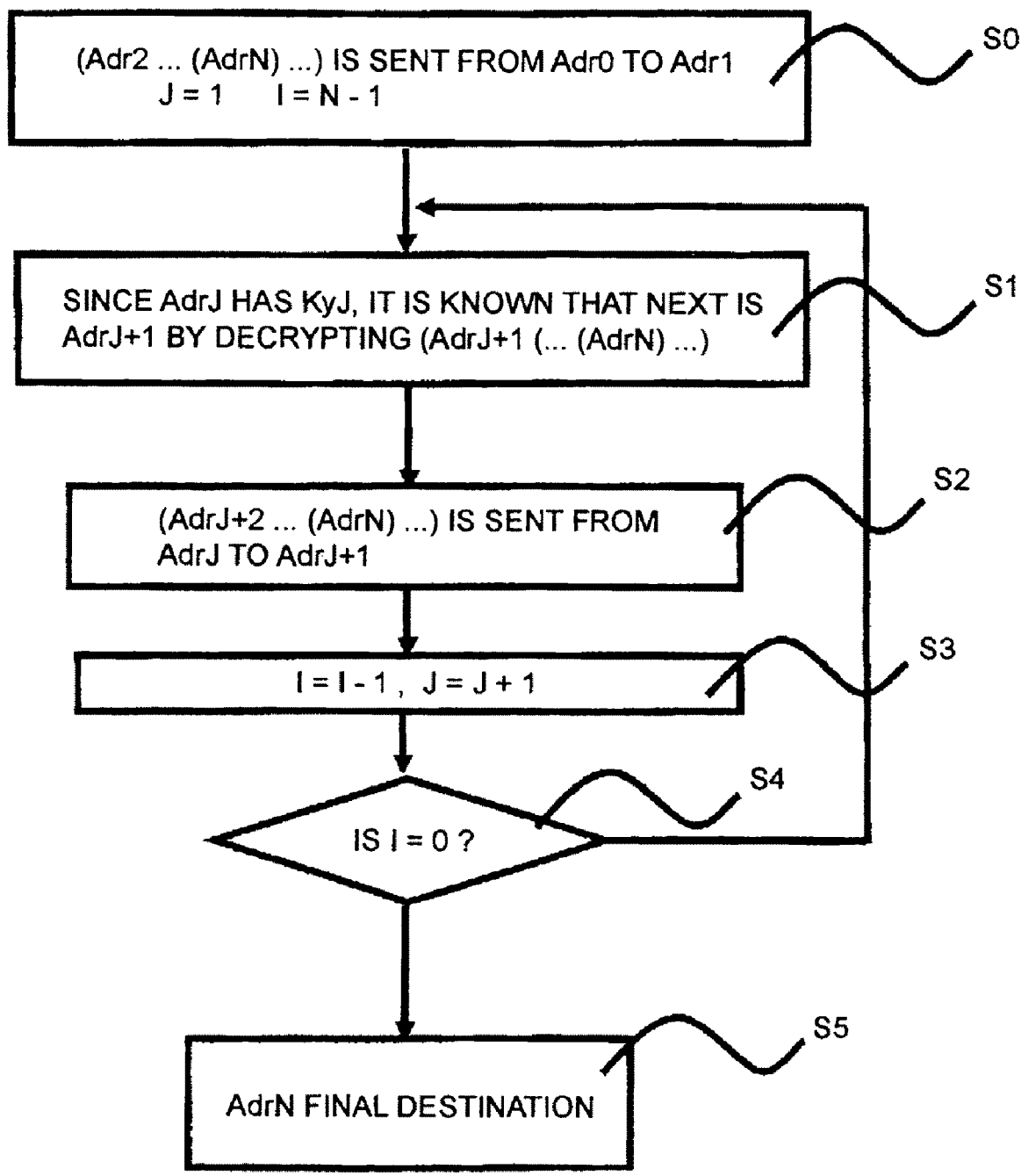
FIG. 1 is a flow chart for explaining a method which utilizes conventional onion routing.

CL: Client connected to communication server as subscriber

CL1: Client that is transmission source

FS: Function server that is transmission destination (one of clients)

CS1: Communications server 1 that has clients as subscriber

CS2: Communications server 2 that has clients as subscriber

CS3: Communications server 3 that has clients as subscriber

CS4: Communications server 4 that has clients including function server FS as subscriber CS5: Communications server 5 that has clients as subscriber LG1: Local group connected to communication server 1
LG2: Local group connected to communication server 2
LG3: Local group connected to communication server 3
LG4: Local group connected to communication server 4
LG5: Local group connected to communication server 5

LNW: Network in which communication servers are connected in loop (ring) shape (loop network)

R: Random bit string

FSOK: Public key of function server FS

FSSK: Secret key of function server FS

KX1: Code string in which R is encrypted by public key FSOK

H: Hash value of R

AR1: Confidential address 1 (KX1,H) composed of KX1 and H, which is sent to function server FS CSOK: Public key of communication server CS CSSK: Secret key of communication server CS CS4OK: Public key of communication server CS4

CS4SK: Secret key of communication server CS4

TX1: Code string in which R is encrypted by CS4OK

AR2: Confidential address 2 (TX1,H) composed of TX1 and H, which is for connection to communication server CS4

CL1OK: Public key of client CL1

CX1: Code string in which R is encrypted by CL1OK

AR3: Confidential address 3 (CX1,H) for responding from function server FS to client CL1

TX2: Code string in which R is encrypted by CS2OK

AR4: Confidential address 4 (TX2,H) for connecting response from function server FS to communication server CS2

MS: Communication data, and message composed of TCP header, confidential address group, encrypted message body, and the like PX1: Password for encrypting message body B: Public bulletin board T1: Information inputting terminal connected to information server T2: Information inputting terminal connected to function server

BEST MODE(S) FOR CARRYING OUT THE INVENTION

Figure 2:
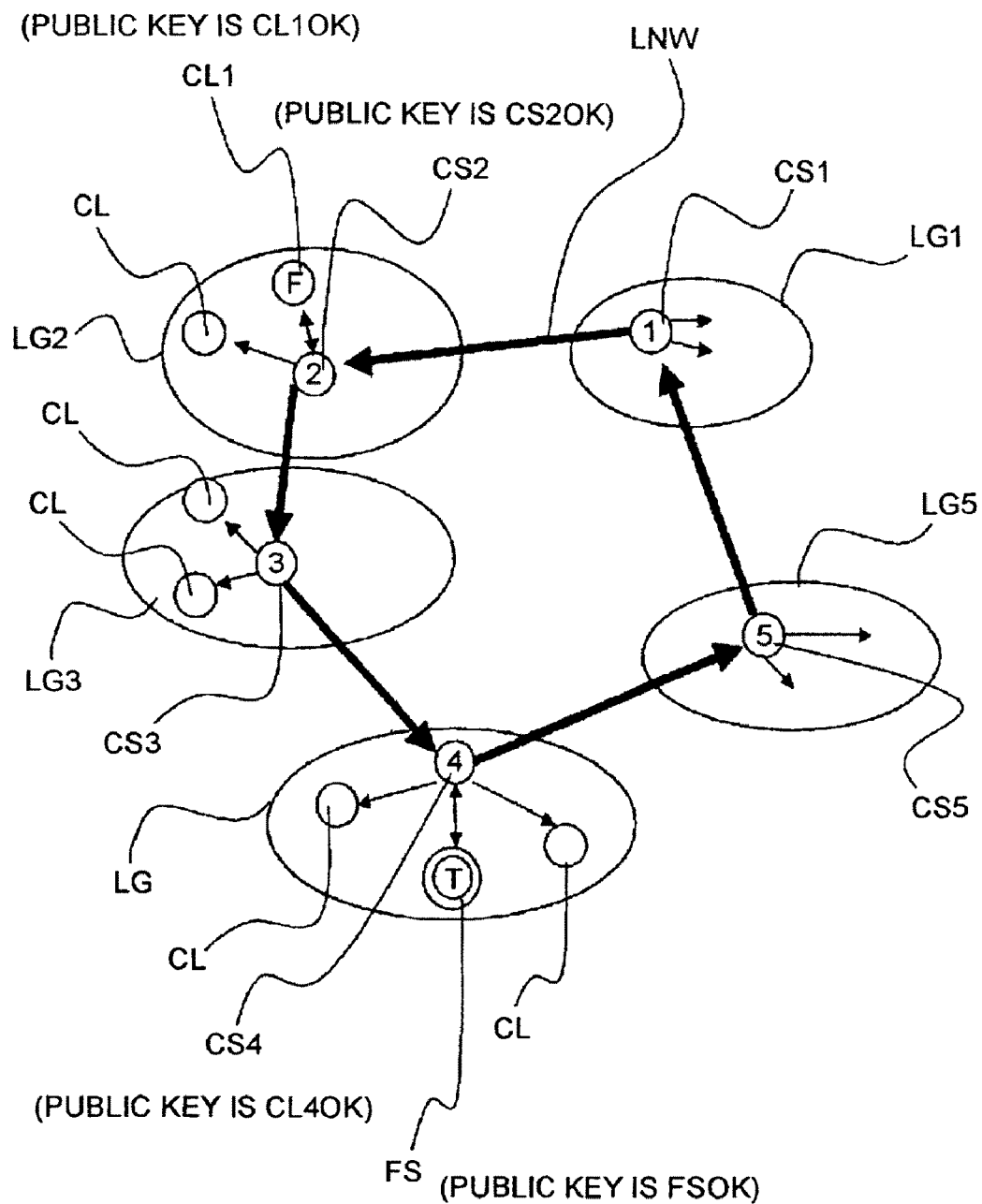
FIG. 2 is a view for explaining a system configuration which is one embodiment of the present invention.
Figure 3:
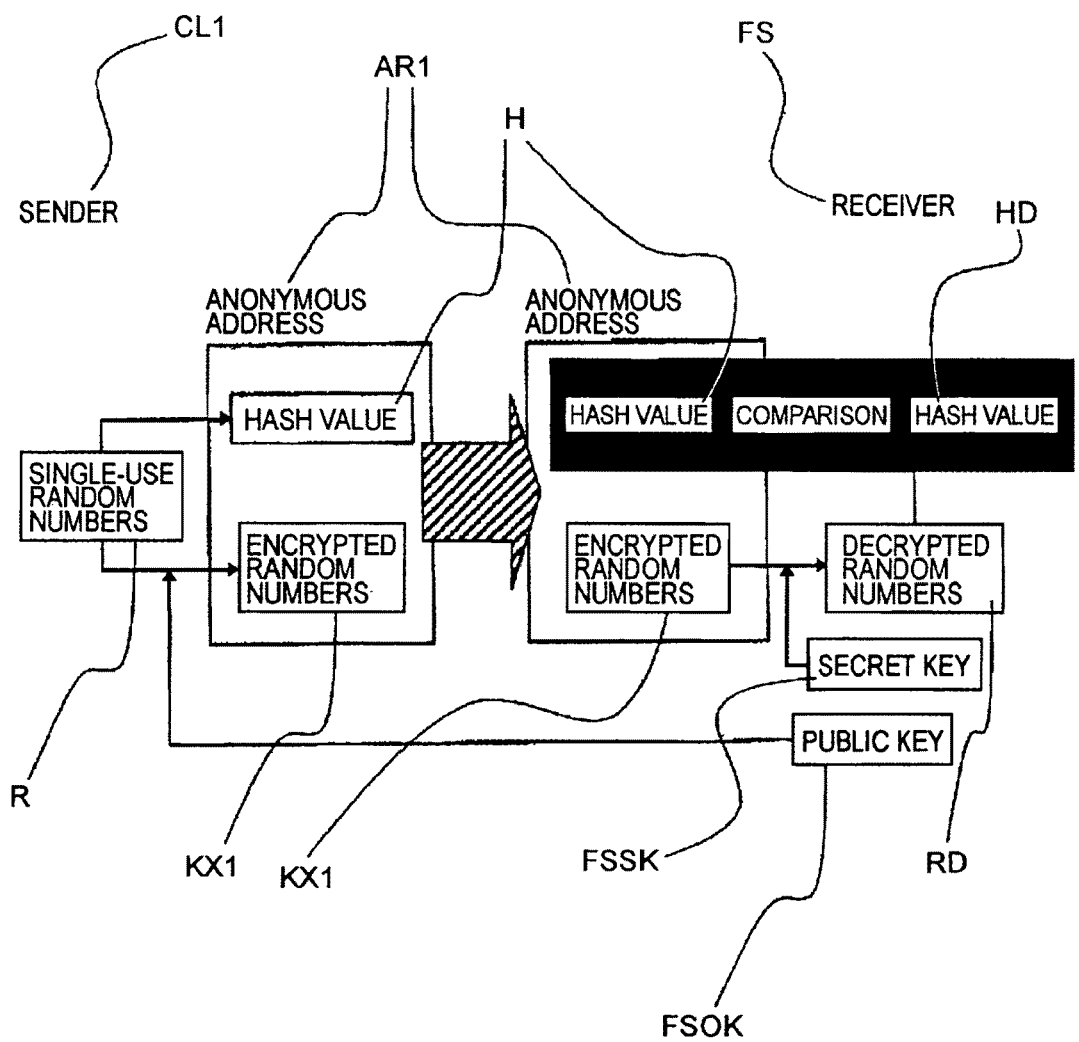
FIG. 3 is a view for explaining a principle of passing confidential addresses back and forth in the present embodiment.
Figure 4:
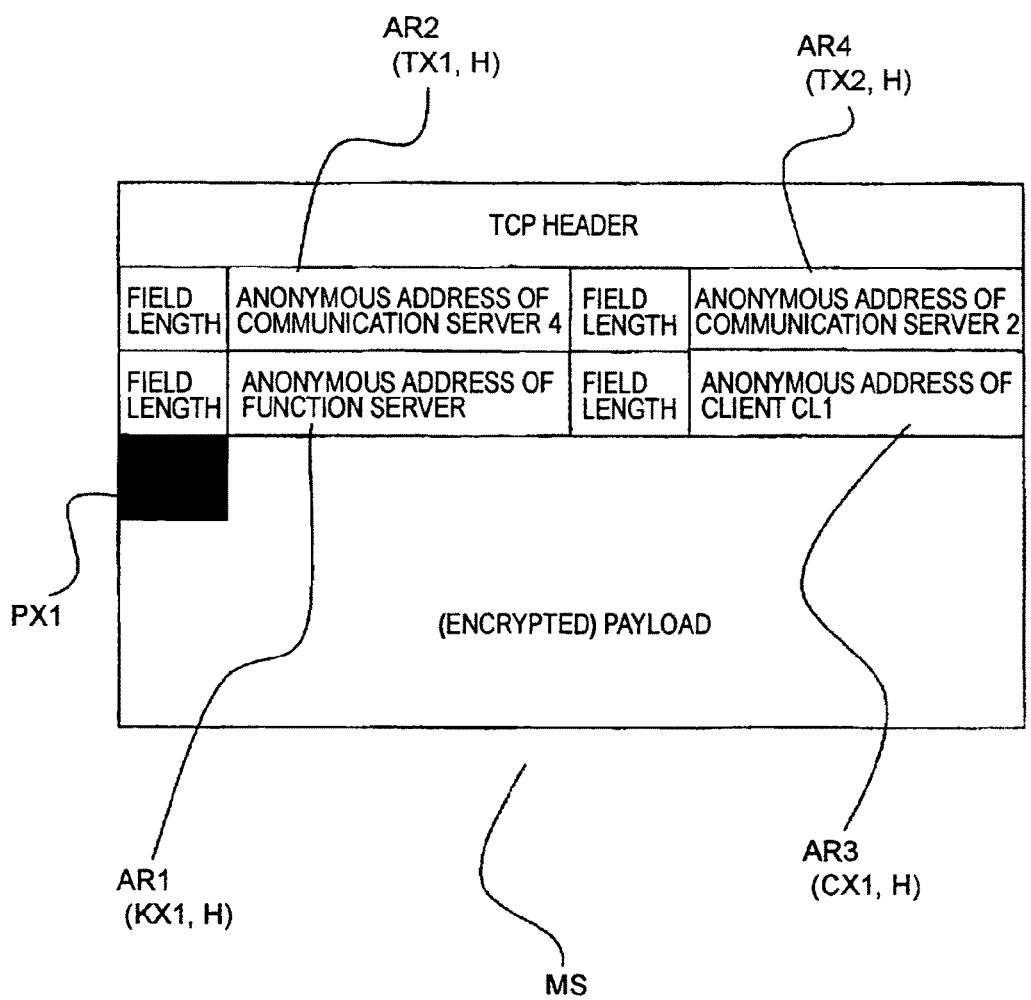
FIG. 4 is a view for explaining a data structure in the present embodiment.

Next, a system and a communication procedure of the present invention will be briefly described using FIG. 2, FIG. 3, and FIG. 4. A configuration of a confidential message (it is also called as MS) of the present embodiment, which is communication data will be described later.

(System Summary)

The present invention is a system constituted by combining broadcast communication or on-demand communication, and a code which is composed of a public key, a secret key, and the like. The present invention is characterized by using a field encrypted by the public key as an address. In the system of the present invention, in order to perform the broadcast communication or the on-demand communication efficiently, it is preferable to form a logical loop beforehand as routing in an application level. It is to be noted that the on-demand communication which is logically equivalent to the broadcast communication may be utilized in the implementation of the present invention.

(Components)

Components of the network in the present embodiment are as follows.

(1) General users: Users that utilize the confidential communication from homes or offices. They are clients in FIG. 2 (hereinafter, CL). A sender of the confidential message in the present embodiment is referred to as the client (hereinafter, CL1).

(2) Communication servers: They are servers that receive the confidential message from CL1 and transmit it. Further, they are servers that receive and store the confidential message to be transmitted to CL. Moreover, they are servers for forming a logical loop (loop network) among the communication servers. They are represented as CS (CS1-CS5) in FIG. 2.

(3) Second and third communication servers: They are servers that can be alternate communication servers in case of failure of CS. In FIG. 2, if, for example, CS4 is shut down, CS3 adds all the clients of CS4 to its subscriber and manages them. This multiplexed means can be easily achieved by common network management means.

(4) Function server: It is a server provided with functions of a consultation service, a health consultation counselor, and a complaint reception station at a site or the like for providing services to the general users. In FIG. 2, FS connected to, for example, CS4 corresponds to this.

(5) Subscribers: They are clients CL and FS that are subordinates of CS in FIG. 2. In order to maintain anonymity, FS and CS are preferably separated physically.

(Preconditions)

Preconditions of the system shown in FIG. 2 will be hereinafter described.

(1) A sequence that the confidential message is transmitted among CS1-CS5 is determined beforehand. In FIG. 2, it forms a loop network or a ring network (hereinafter, LNW) in which each CS is connected in a loop shape.

(2) CS beforehand notifies its IP address and public key, where, for example, the public key of CS4 is CS4OK, to CS3 (upper stream server which transmits the confidential message).

(3) FS publishes contents of the received confidential message, CSOK which is the public key of CS to which the FS belongs, and its own public key FSOK.

(4) CL and FS are registered into any one of the local groups (LG1-LG5) connected to CS.

(Transmission Procedure from CL1 to CS4)

A procedure for transmitting the confidential message from CL1 to FS will be described based on FIG. 2.

(1) CL1 obtains the public key (FSOK) of FS which is a transmission destination of the confidential message, and the public key (CS4OK) of CS4 to which FS belongs.

(2) CL1 encrypts given information by CS4OK and FSOK, and creates the confidential message (it is also called MS). A data structure of the confidential message is as shown in FIG. 4.

(3) CS2 stores the confidential message in a transmission buffer.

(4) CS2 transmits the confidential message to CS3.

(5) CS3 which has received the confidential message copies and stores the confidential message, and then transmits it to CS4. Hereafter, CS5 transmits the confidential message to CS1, and CS1 transmits the confidential message to CS2, in a similar manner.

(6) When CS2 receives the confidential message from CS1, CS2 deletes the confidential message from the buffer which has stored it.

(7) CS1-CS5 attempt to decrypt the stored confidential messages by CSSKs which are respective secret keys thereof. In the present embodiment, the confidential message is encrypted by CS4OK. Hence, only CS4 can decrypt the confidential message, and CS4 stores the confidential message. CSs other than CS4 delete the confidential message from the buffers which have stored the confidential message at the time when they were not able to decrypt the confidential message.

(Transmission from CS4 to FS and Reception Procedure of FS)

(1) FS and two CLs are connected to CS4 in FIG. 2. Each CL and FS receive the confidential message stored in CS4 by broadcasting from CS4, or by on-demand to CS4. Subsequently, FS attempts to decrypt AR1 which is a specific field shown in FIG. 4 by FSSK which is its own secret key, and if FS is not able to decrypt AR1, it determines that the confidential message is not addressed to itself.

(2) If FS is able to decrypt AR1, it determines that the confidential message is addressed to itself, and takes this in.

(3) The confidential message is preferably deleted from CS4 when a certain period of time elapsed, for example. Note that it is preferable that clients other than FS are not able to decrypt the received message body. For that purpose, it is preferable to encrypt the message body which is message contents of the confidential message by FSOK which is the public key of FS, to also generate an encrypted password PX1, and to transmit the encrypted password PX1 while including it in the message.

(Response Procedure to Transmission Source (CL1))

A transmission procedure of a response message to CL1, which is the present embodiment, is as follows. If a response to the confidential message is required, it is performed as follows. As shown in the data structure of the confidential message in FIG. 4, CL1 that is a sender of the confidential message encrypts a random number bit string (random bit string) R by its public key CL1OK as its own confidential address (AR3 shown in FIG. 4), and inserts it into the confidential message. CL1 also encrypts the random number bit string R by the public key CS2OK as the confidential address (AR4 shown in FIG. 4) of CS2 to which CL1 connects, and inserts it into the confidential message.

Note that FS may generate a confidential address AR3 (CX1,H) of CL1, and a confidential address AR4(TX2,H) composed of a code string TX2 and a hash value H, in which the code string TX2 is generated by encrypting the random number bit string R by CS2OK which is the Public key of CS2.

As described above, it is possible to specify a response destination while securing anonymity. Moreover, in order to hide a response message body to the message body transmitted by CL1, a password according to, for example, random numbers may be created, the password and the response message body may be encrypted by CL1OK, and an encrypted password PX2 may be transmitted while including it in the response message, in a manner similar to that of PX1 transmitted by CL1.

In FIG. 2, the response message is transmitted from FS to CS4, and sent to CS2, via LNW by CS4.

CS2 can decrypt the confidential address AR4 by CS2SK which is its own secret key. As a result, it turns out that the response message is addressed to any one of CLs connected to CS2. Accordingly, CS2 transmits the response message by broadcasting, or by on-demand from each CL connected to CS2. Since CL1 can decrypt the confidential address AR3 by CL1OK which is its own public key, it can determine that the response message is addressed to itself.

(Confidential Address Generation)

A method of generating the confidential address AR1 in the confidential message which is transmitted from CL1 to FS, and a confidential address AR2 to CS4 to which FS connects will be hereinafter described according to FIG. 3.

First, the confidential address AR1 is generated as follows.

(1) A single-use random bit string R is prepared.

(2) A hash value H of the random bit string R is created using a method, such as MD5 or the like.

(3) The random bit string R is encrypted by the public key FSOK of FS which is the transmission destination (receiver), and it is set to KX1.

(4) KX1 and H are made into a set and it is set as the confidential address AR1=(KX1,H).

Although the receiver can decrypt AR1 which is the confidential address, clients other than the receiver are not able to decrypt it. FS gets to know that FS itself is the receiver according to following procedures.

(1) FS decrypts KX1 in AR1 by its own secret key, and obtains decryption random numbers RD;

(2) FS calculates for a hash value HD of that result.

(3) If the hash value H in AR1 and the aforementioned hash value HD are equal to each other, FS will regard that the message is addressed to itself.

In the data structure shown in FIG. 4, it is preferable that field length is declared to all the fields in order to correspond to a variable length field, other than a TCP header corresponding to a TCP protocol.

AR2(TX1,H) which is the confidential address needed to pass the confidential message from CL1 to CS4, and AR1 (KX1,H) which is the confidential address of the transmission destination (FS that is the receiver) are inserted in each field. In addition, in order to return the response message from FS to CL1, AR4(TX2,H) which is the confidential address of CS2 to which CL1 connects, and AR3(CX1,H) which is the confidential address needed to pass the response message to CL1 are inserted therein.

It is preferable to encrypt, together with the password PX1 for decryption, the response message body of the response message (response to the transmission message body of CL1) by the public key FSOK of FS. While transmission and reception of the confidential messages of CL1 and FS has been hereinbefore described, even when it is transmission and reception of the confidential messages to not FS but CL connected to CS4, the confidential communication can be performed by a method similar to the aforementioned method.

(Communication Experiment)

Figure 5:
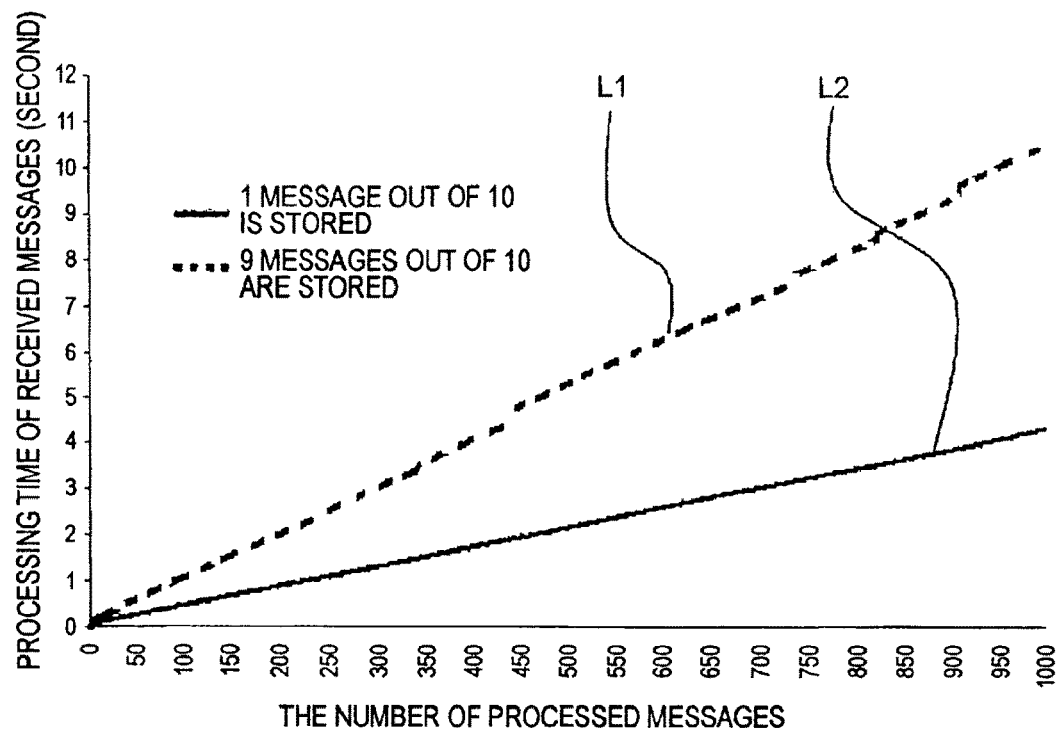
FIG. 5 is a graph which shows a result obtained by having measured a processing time of unread messages in the present embodiment.

FIG. 5 is a graph showing results in the embodiment of the present invention, in which all the unread messages are transmitted from CS to CL via the Internet, and a time required for CL to decrypt whether or not the message is addressed to itself is measured. More specifically, it is the graph showing the results in which the unread messages up to 1000 are stored in CS, and the time required for CL to decrypt these messages is measured. Experiment environments and measurement results will be described in the following.

(Communication Speed Evaluation)

A reception processing time when increasing the number of turnaround messages from transmission to reception of the confidential message through the Internet to 1000 messages is as shown in FIG. 5.

(Experiment Environments)
(Encryption Conditions)
Encryption scheme: RSA (key length is 1024 bits)
Hash algorithm: SHA1
Message length: 103 bytes before encryption, 112 bytes after encryption
Encryption scheme of message: AES (key length is 256 bits)
(Capabilities of PC and the Like)
Client PC: NEC-VersaPro (registered trademark)
CPU: Pentium (registered trademark) M740 1.73 GHz
Memory: ECC-less DDR2-SDRAM PC2-4200 1280 MB
OS: Windows (registered trademark) Professional (SP2)
NIC: 1000BASE-T/100BASE-Tx/10BASE
Communication server: Dell (registered trademark) Dimension 1100
CPU: Intel (registered trademark) Pentium (registered trademark) 4
Memory: DDRSDRAM PC3200
OS: UbuntuLinux7.04 (registered trademark)
NIC: 100BASE-Tx/10BASE-T
Network (HUB): 100BASE-TX
(Experimental Results)
A dashed line L1 in FIG. 5 represents a case where nine messages out of ten are addressed to itself, while a solid line L2 represents a case where one message out of ten is addressed to itself. There is found a tendency that the processing time increases in proportion to the increase in the number of messages. Moreover, even when 100 messages out of 1000 are addressed to itself, the processing time is a maximum of approximately 4 seconds, and thus it turned out that it can sufficiently withstand practical use.

(First Application)

A first application of the present invention includes application to the public bulletin board system. As application of the confidential communication system, this application is applied to the bulletin board system, which is a system to allow for heart-to-heart communications. This is a system in which even an administrator, of the bulletin board cannot specify CL that has written on the bulletin board, and is suitable for the confidential communication system that deals with, for example, honest opinions of students who look for jobs and the like to companies, claims against hiring interviews, and the like.

Figure 6:
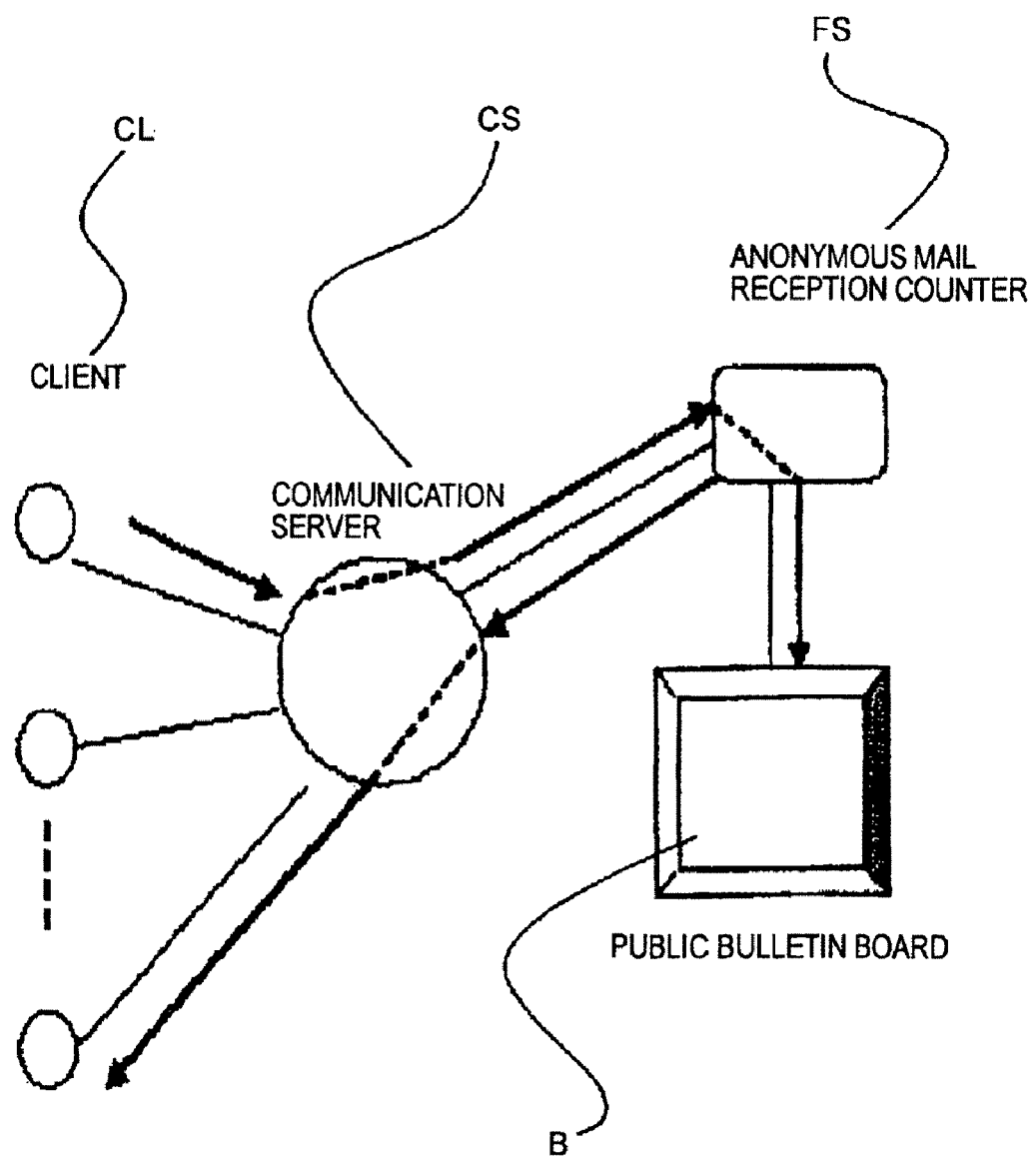
FIG. 6 is a view showing an example in which the present invention is applied to a public bulletin board.

A system summary of this application will be shown in FIG. 6. Here, CL corresponds to students, persons in charge of companies, and the like, and FS serving as a mail reception counter corresponds to an organization for supporting student's job-hunting activities and recruitment activities of the company.

The contents written on a public bulletin board B in FIG. 6 are anonymously sent to the mail reception counter (corresponding to FS). If there is no problem in the written contents, the contents are posted on the public bulletin board B along with message numbers.

CL that has looked at the public bulletin board B sends a secret question, a dissenting opinion, or the like, to the message number published by the mail. If there is no problem in the contents of the message, the mail will be posted. However, if there is a problem, the original message is replied to CL that is the sender via CS on the basis of the method of the present invention, and the message will not be posted.

(Second Application)

Figure 7:
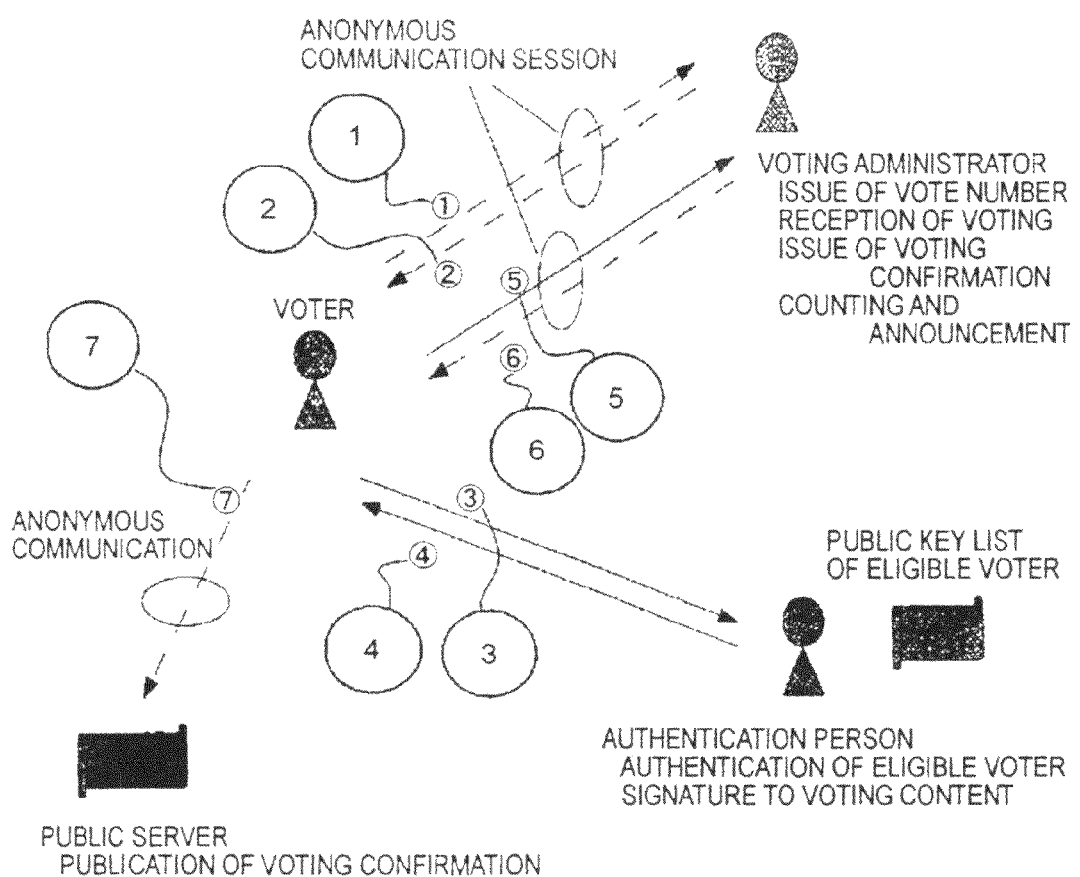
FIG. 7 is a view showing an example in which the present invention is applied to a voting system.

A second application of the present invention includes application to an electronic voting system. As a large-scale electronic voting system, a method by a blind signature is promising, but this method needs to secure communication anonymity separately. Combining the method of the present invention with the blind signature makes it possible to achieve a practical and large-scale electronic voting system. The electronic voting system to which the method of the present invention is applied will be schematically shown in FIG. 7. A system conventionally proposed is composed of following procedures indicated by solid line arrows in the figure.

(1) A voter masks its vote content with random numbers to subsequently submit it to an authentication person (route 3).

(2) After authenticating the voter, the authentication person signs the vote content and returns it to the voter (route 4).

(3) The voter removes the mask from the signature obtained from the authentication person, and submits it to a voting administrator together with the vote content (route 5). Since security of anonymity is required in the route 5, the method of the present invention can be applied to this route. Further, utilizing a feature of the present invention that information can be transmitted and received while securing anonymity makes it possible to improve the voting method as follows (refer to dashed line arrows in FIG. 7).

(4) Vote confirmation can be received at the time of voting (route 6). Thereby, it is possible to prevent voting establishment from interference, such as claiming that "Vote is not received" after the voting is closed, while suspending voting rights in fact. Since the result of the voting can be verified after the voting is closed, it becomes unnecessary to announce the progress of the voting. In addition, if there is illegality in voting tabulation, the voter may publish the received voting confirmation by a certain way, as its own measure (route 7), thus reducing the risk of voting secrecy to be violated.

(5) In order to avoid accidental false detection on detection of duplicate voting, it is needed to draw unique information, but according to this proposal, it is possible to achieve this while anonymity is maintained (route 1, route 2).

It is to be noted that the application of the present invention is not limited to general-purpose lines, such as the Internet and the like. For example, the TCP header is illustrated in FIG. 5 as an example applied to the Internet, but it is not limited to this. Moreover, it is theoretically applicable to protocols of mobile phones and the like, and a combination of the public key and the secret key can be utilized regardless of the line types.

(Modified Embodiment)

Figure 8:
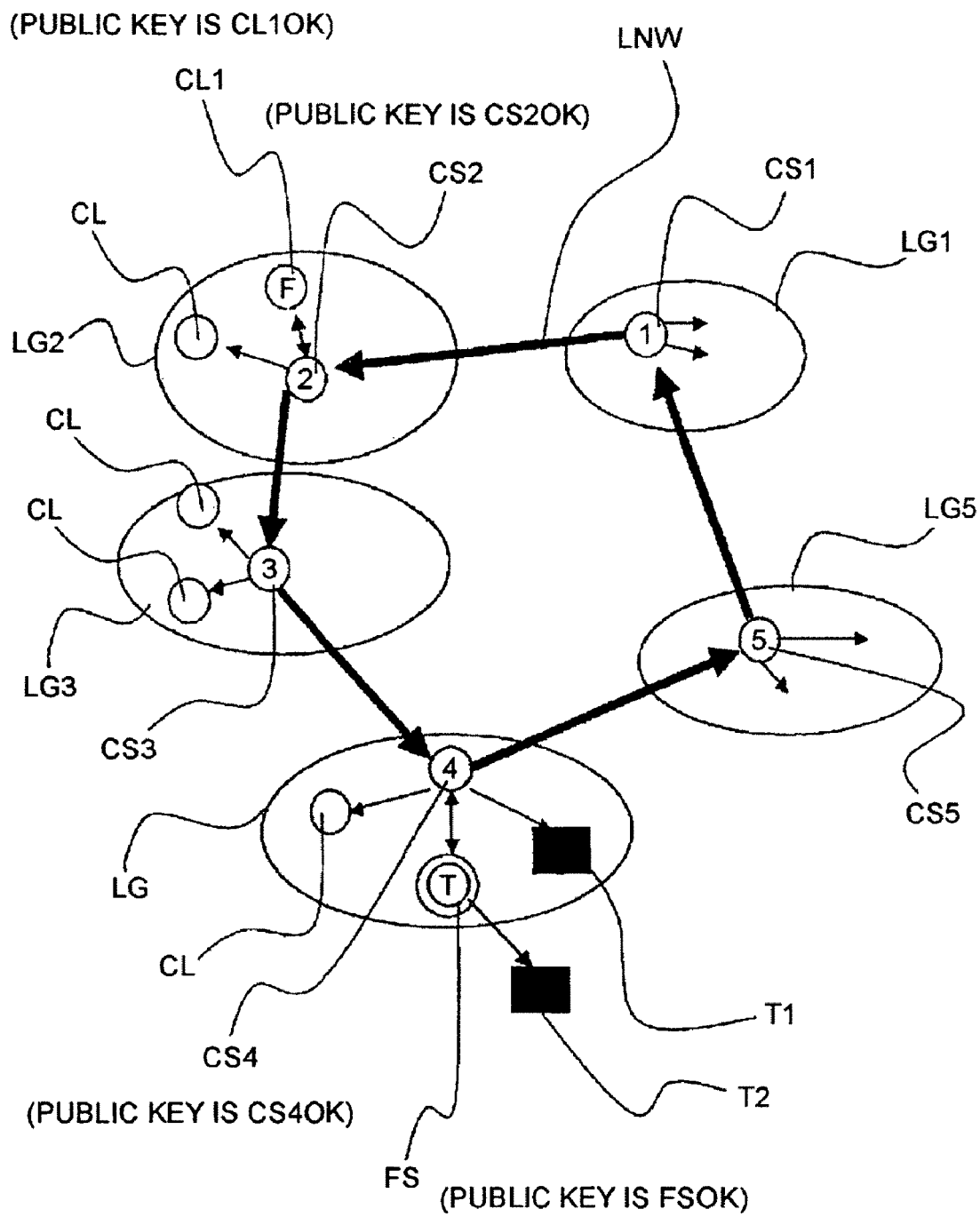
FIG. 8 is a view showing a modified embodiment of the present invention.

According to the method of the present invention, not all components need to be connected through the network. FIG. 8 will be described as an example. FIG. 8 has the same configuration as that in FIG. 2 basically, but the difference is that T1 which is the information inputting terminal is connected to CS4. Note that it may be a configuration that T2 which is the information inputting terminal is connected to FS.

T1 or T2 is an input terminal device for off-line, and is a terminal device, such as a flexible disk, a memory stick, or in some cases, a key input or the like, for inputting information required for the response, along with information that the information provider wants to visit and provide for itself.

When the information inputting terminal is set in a cash dispenser, or a "baby hatch" which is not connected to the network, it is possible to build a system which can deal with various problems, while securing anonymity.

This description is based on Japanese Patent Application 2008-000211 filed on Jan. 4, 2008. This content is hereby incorporated in its entirety.

The invention claimed is:

1. In a confidential communication method of messages transmitted and received between a transmission source client that is a subordinate of one communication server of a plurality of communication servers, and a transmission destination client that is a subordinate of another communication server of the plurality of communication servers, wherein the transmission source client and the transmission destination client are connected to a loop network which forwards a message on a basis of a predetermined rule, and in the confidential communication method of the messages, the transmission source client creates first confidential address information including a hash value of a generated random bit string, and a code string obtained by encrypting the random bit string using a public key of the transmission destination client, and second confidential address information including a code string obtained by encrypting the random bit string using a public key of the another communication server to which the transmission destination client connects, and the hash value, and forwards a message including at least the first confidential address information, the second confidential address information, and a message body, to the loop network via the one communication server.

2. The confidential communication method of the messages according to claim 1, wherein the transmission source client further creates third confidential address information including a code string obtained by encrypting the random bit string using a public key of the transmission source client, and said hash value, and fourth confidential address information including a code string obtained by encrypting the random bit string using the public key of the another communication server to which the transmission destination client connects, and said hash value, and transmits the third confidential address information and the fourth confidential address information while including the third confidential address information and the fourth confidential address information in the message addressed to the transmission destination client.

3. The confidential communication method of the messages according to claim 1, wherein the another communication server to which the transmission destination client connects decodes the second confidential address information in the message forwarded via the loop network using a secret key corresponding to the public key of the another communication server to which the transmission destination client connects, and transmits the second confidential address information in the message to one or a plurality of clients that are subordinates of the another communication server to which the transmission destination client connects if said hash values thereof are matched with each other, and a client in the one or the plurality of clients that are the subordinates of the another communication server that has received the message decodes the first confidential address information in the message using a secret key of the client that has received the message, and receives the message as the message is addressed to the client that has received the message if said hash values thereof are matched with each other.

4. The confidential communication method of the messages according to claim 3, wherein a message body of the message transmitted from the transmission source client is an encrypted transmission sentence including a password encrypted using the public key of the transmission destination client, and the transmission destination client decrypts the encrypted transmission sentence using a secret key of the transmission destination client.

5. The confidential communication method of the messages according to claim 2, wherein the transmission destination client that has received the message transmitted from the transmission source client, as a return message of the received message, forwards a return message including at least the third confidential address information, the fourth confidential address information, and a return message body, to the loop network via the another communication server to which the transmission destination client connects.

6. The confidential communication method of the messages according to claim 5, wherein the one communication server to which the transmission source client connects decodes the fourth confidential address information in the return message forwarded via the loop network using a secret key corresponding to a public key of the one communication server, and transfers the return message to one or a plurality of clients that are subordinates of the one communication server if the hash values thereof are matched with each other, and a client of the one or the plurality of clients that are the subordinates of the one communication server that has received the return message decodes the third confidential address information in the return message using a secret key of the client that has received the return message, and receives the return message as the return message is addressed to the client that has received the return message if said hash values thereof are matched with each other.

7. The confidential communication method of the messages according to claim 6, wherein a message body of the return message transmitted from the transmission destination client is an encrypted transmission sentence including a password encrypted using the public key of the transmission source client, and the transmission source client decrypts the encrypted transmission sentence using a secret key of the transmission source client.

8. The confidential communication method of the messages according to claim 1, wherein, if a failure occurs in any of the plurality of communication servers, other predetermined communication server functions as the any of the plurality of communication servers in which the failure has occurred.

9. The confidential communication method of the messages according to claim 8, wherein, if a forwarded message is matched with a message already held, each of the plurality of communication servers determines that the forwarded message has taken around the loop network, and stops transferring of the forwarded message.

10. The confidential communication method of the messages according to claim 8, wherein, when transferring a received message to clients that are subordinates of each of the plurality of communication servers, each of the plurality of communication servers deletes the received message held in the each of the plurality of communication servers.

11. The confidential communication method of the messages according to claim 9, wherein transmission and reception of the messages between each of the plurality of communication servers and the clients that are the subordinates thereof is broadcast communication or on-demand communication.

* * * * *